(12) United States Patent
Schweiger et al.

(10) Patent No.: US 8,112,073 B2
(45) Date of Patent: Feb. 7, 2012

(54) SYSTEM FOR MOBILE RADIO COMMUNICATION WITH AT LEAST ONE SUBSCRIBER AREA LOCATED IN AN OVERALL AREA

(75) Inventors: Tobias Schweiger, Munich (DE); Agustin Macarro, Munich (DE); Gary Waite, Faringdon (GB)

(73) Assignee: O₂(Germany) GmbH & Co. oHG, München (DE)

( * ) Notice: Subject to any disclaimer, the term of this patent is extended or adjusted under 35 U.S.C. 154(b) by 162 days.

(21) Appl. No.: 10/552,313

(22) PCT Filed: Apr. 8, 2004

(86) PCT No.: PCT/EP2004/003803
§ 371 (c)(1),
(2), (4) Date: Sep. 11, 2006

(87) PCT Pub. No.: WO2004/091242
PCT Pub. Date: Oct. 21, 2004

(65) Prior Publication Data
US 2007/0004454 A1    Jan. 4, 2007

(30) Foreign Application Priority Data
Apr. 8, 2003  (DE) .................................. 103 16 063

(51) Int. Cl.
*H04M 11/00* (2006.01)
*H04B 1/38* (2006.01)
(52) U.S. Cl. ...................... 455/421; 455/456.1; 455/418; 455/558
(58) Field of Classification Search ................ 455/422.1, 455/440
See application file for complete search history.

(56) References Cited

U.S. PATENT DOCUMENTS

| | | | | |
|---|---|---|---|---|
| 5,802,468 A * | 9/1998 | Gallant et al. | ............. | 455/422.1 |
| 5,905,957 A * | 5/1999 | Olds | ........................... | 455/435.1 |
| 6,018,653 A * | 1/2000 | Hietalahti et al. | ............ | 455/406 |
| 6,216,007 B1 * | 4/2001 | Havinis et al. | ............. | 455/456.2 |
| 6,385,458 B1 * | 5/2002 | Papadimitriou et al. | ... | 455/456.2 |
| 6,708,033 B1 * | 3/2004 | Linkola et al. | ............... | 455/440 |
| 7,110,776 B2 * | 9/2006 | Sambin | ....................... | 455/456.1 |
| 7,587,205 B1 * | 9/2009 | Odorfer et al. | ............... | 455/440 |
| 2003/0148775 A1 * | 8/2003 | Spriestersbach et al. | ..... | 455/456 |
| 2003/0182052 A1 * | 9/2003 | DeLorme et al. | ............ | 701/201 |
| 2005/0101323 A1 * | 5/2005 | De Beer | ..................... | 455/435.2 |

FOREIGN PATENT DOCUMENTS

| | | |
|---|---|---|
| DE | 197 31 461 | 12/1998 |
| WO | 96/39000 | 12/1996 |
| WO | 98/39940 | 9/1998 |
| WO | 00/56104 | 9/2000 |

* cited by examiner

*Primary Examiner* — George Eng
*Assistant Examiner* — Frank Donado
(74) *Attorney, Agent, or Firm* — Dilworth & Barrese, LLP.

(57) ABSTRACT

The present invention relates to a communications system for mobile radio telephony comprising mobile devices, comprising modules which can be inserted into the mobile devices, with at least one subscriber territory being fixed inside the total territory covered by the communications system, within which subscriber territory communication takes place from and/or to the mobile devices under special conditions, and comprising means by which it can be determined whether the mobile device is located inside the subscriber territory. In accordance with the invention, the means are arranged on the module or in a determination unit which can be accessed by means of remote polling.
The present invention furthermore relates to a method of operating a communications system for mobile radio telephony.

30 Claims, 9 Drawing Sheets

SYSTEM FOR MOBILE RADIO COMMUNICATION WITH AT LEAST ONE SUBSCRIBER AREA LOCATED IN AN OVERALL AREA

BACKGROUND OF THE INVENTION

The present invention relates to a communications system for mobile radio telephony comprising mobile devices and comprising modules which can be inserted into the mobile devices, with at least one subscriber territory being fixed inside the total territory covered by the communications system, within which subscriber territory communication takes place from and/or to the mobile devices under special conditions, and with means being provided by which it can be determined whether the mobile device is located inside the subscriber territory. The present invention further relates to a method of operating a communications system for mobile radio telephony using mobile devices and using modules which can be inserted into the mobile devices, with at least one subscriber territory being fixed inside the total territory covered by the communications system, within which subscriber territory communication takes place from and/or to the mobile devices under special conditions, and with a determination taking place whether the mobile device is located inside the subscriber territory.

A communications system and method of this type is known from EP 1 159 842. The known communications system covers a total territory which is divided into location areas and within which communication from and to the devices is possible. The total territory is divided into location areas which in turn have radio cells which are serviced by a transmitter and receiver station of the communications system. The mobile devices operable in the total territory have SIM modules which can be inserted into them and which permit an unambiguous identification of the mobile device provided therewith inside the communications system. Coordinates are furthermore stored on the SIM modules which consist of a location point with the coordinates Xh, Yh and a radius Rh which fixes a circle around the location point. At regular intervals, the transmitter and receiver stations of the communications system transmit identifiers of the associated radio cell and coordinates characteristic of the radio cell which can be received by mobile devices located in the region of the transmitter and receiver stations. A mobile device equipped with a corresponding application checks whether the received coordinates of the radio cell fall into the circle whose coordinates Xh, Yh, Rh are stored in a memory on the SIM module. If this is the case, i.e. if the coordinates of the radio cell lie within the circle, it is indicated to the user in the display of his device that his mobile device is located in the region of a transmitter and receiver station which is within the aforesaid circle. The background for the determination of subscriber territories of this type is the possibility of providing the user with special conditions, in particular reduced prices, provided his mobile device is located in a subscriber territory.

The examination whether the mobile device is located in a subscriber territory takes place on the part of the mobile device which is equipped with a corresponding software application. The software accesses the data Xh, Yh, Rh stored on the SIM module and checks with reference to the data received on the network side whether the mobile device is located in the subscriber territory. If this is the case, it will be indicated to the user on the display of the mobile device.

It is disadvantageous with the previously known communications system that the named examination of the association with a subscriber territory takes place by means of a software application located on the mobile device. Accordingly, especially equipped mobile devices are required. Mobile devices which do not have an application of this type can admittedly receive the identifiers and coordinates of the location areas and radio cells, but are not capable of determining whether an association of the location of the mobile device with a subscriber territory is present or not. It is therefore disadvantageous for the operator of a communications system of this type that he cannot offer the customer mobile devices which do no have the named application if the customer desires the aforesaid service. A further disadvantage results from the higher costs of mobile devices which have the required application.

SUMMARY OF THE INVENTION

It is therefore the object of the present invention to provide a communications system and a method of operating a communications system in which the examination of the association of the location of the mobile device with a subscriber territory can be carried out and which permits the use of mobile devices which do not have a corresponding functionality.

This object is solved by a communications system and method having the features herein.

In accordance with the invention, the means by which it can be determined whether the mobile device is located inside the subscriber territory are arranged on the module or in a determination unit which can be accessed by means of remote polling. In a preferred embodiment of the invention, the module is the SIM module. Since the examination whether the mobile device is located in a subscriber territory does not take place in the mobile device itself, but rather on the module or in a determination unit which is not arranged in the mobile device, but as a component which can be addressed via remote polling, preferably via the communications system, mobile devices can be used which do not have to have a special functionality to carry out the examination whether the mobile device is located in a subscriber territory or not. The advantage results from this that the mobile devices are more favorable in price due to the lack of a special application. The advantage results for the operator of the communications system that the customer can be offered a larger number of different mobile devices since a special design of the mobile devices is no longer important.

The determination unit can be designed such that the information can be transmitted to the mobile device whether the mobile device is located in a subscriber territory or not. The determination whether this is the case takes place in the determination unit in this aspect of the invention. It preferably receives the identity data of the location areas or radio cells in which the mobile device is located from the module and then carries out the corresponding evaluation. The result is transmitted to the mobile device or to the module by means of the communications network.

In a preferred aspect of the invention, means are provided by which the user can be advised whether the mobile device is located inside the subscriber territory. These means can, for example, be acoustic or optical means or other means of the mobile device.

Advantageous aspects of the invention are also the subject herein.

Location areas are typically arranged in the total territory covered by the communications system and one or more radio cells are located therein. The subscriber territories can include one or more location areas in whole or in part or also only cover part of a location area. Radio cells are located inside the location areas and are generally serviced by a transmitter and receiver station of the communications system. The subscriber territory can have very different sizes. A subscriber territory known as a city zone, which covers the area of a city, can, for example, include fifteen location areas in which several hundred radio cells are located.

The location areas and/or the radio cells can have these characterizing identity data. Both the location areas and the radio cells have identifiers which are designated in the following by LAC (location area code) as the identifier for the location area and by CI (cell ID) as the identifier for the radio cell. A radio cell can thus be identified unambiguously when it is indicated in which location area the radio cell is located and which identifier the radio cell has inside the location area. The identifier LAC/CI thus represents a designation clearly defining the radio cell.

Apart from with the aforesaid identifiers, an identification of a location area or of a radio cell is also possible by means of coordinates which include, for example, the abscissa value X and the ordinate value Y of a coordinate system.

Means can be provided in the communications system by means of which the identity data of the location areas and/or of the radio cells can be transmitted to the mobile devices. The transmitter and receiver stations of the communications system preferably transmit the identifier LAC/CI and the coordinates X, Y of the radio cells to the mobile devices. The transmission of coordinates of location areas would generally also be conceivable, provided that they can be clearly identified by coordinates.

In a preferred aspect of the invention, an interface is provided in the mobile devices by means of which the identity data are transmitted to the module. As soon as the mobile device has received the identity data of the location area or of the radio cell in whose region the mobile device is located, these data are transmitted to the module.

Means can be provided in the module and/or in the determination unit of the communications system by means of which the identity data of the location area or of the radio cell in which the mobile device is located are compared with the data characterizing the subscriber territory. This examination can accordingly be carried out in the module itself and/or also in a determination unit which preferably represents a network component reachable via the communications system and which is addressed with a corresponding poll at the instigation of the module in a preferred aspect of the invention.

The data characterizing the subscriber territory can include identifiers or coordinates of the location areas and/or radio cells located in the subscriber territory.

The data characterizing the subscriber territory are preferably stored in the module and/or in the determination unit.

The means by which it can be determined whether the mobile device is located inside the subscriber territory can be designed such that it can be determined by them whether the coordinates of a radio cell or of a location area of the communications system lie in a region which is fixed by a location and by the radius of a circle circumscribing the location as the center. Provided that the coordinates of a radio cell lie inside this circle, whose coordinates can be stored on the module or in the determination unit, this can be displayed to the user. The subscriber territory is formed in this case by the sum of the radio cells whose coordinates lie inside the circle. In this process, the circumference can itself be included where necessary, i.e. coordinates of the radio cell which lie on the circumference are evaluated as still belonging to the area of the circle. It is naturally equally possible to exclude the circumference itself.

The coordinates of the radio cells can be formed by the coordinates of the transmitter and receiver unit of the radio cell.

The described procedure requires that the coordinates of the location area or of the radio cell are transmitted. If, however, the coordinates are not transmitted on the part of the network or are not received by the mobile device, it should nevertheless be able to be determined whether the mobile device is located inside a subscriber territory or not. Provision can be made for this purpose, for example for the identifiers of the location areas or of the radio cells to be designated such that they are in an unambiguous relationship with the coordinates of the location area or of the radio cell so that the coordinates can be determined from the identifiers. The module and/or the determination unit calculate the coordinates of the radio cell from the received identifier of the radio cell and use them as the basis for the further determination described above of the association with a subscriber territory. An encoding of the location areas or of the radio cells is necessary for this purpose which permits a calculation of the coordinates.

Provision is made in a further aspect of the present invention for the module and/or the determination unit to have means by which it can be determined whether the identifier of the location area and/or of the radio cell in which the mobile device is located coincides with a predetermined identifier of the location area and/or radio cell of the of the subscriber territory. In this respect, provision is made in a preferred aspect for the predetermined identifier to be stored in the module or in the determination unit. This aspect of the invention also does not necessarily require the sensing of the coordinates of the radio cell. It can also be determined whether the mobile device is located in a subscriber territory without knowledge of the coordinates of the radio cell by a comparison of the identifier of the location area and/or of the radio cell with predetermined identifiers of the locations areas and/or radio cells which are in a subscriber territory.

To reduce the required memory space, provision can be made in a further aspect of the invention for the identifiers stored in the module or in the determination unit to be stored at least in part in a form reducing the memory requirements. This can in particular be meaningful or necessary when a subscriber territory has the size of a large city and accordingly several hundred identifiers of radio cells arranged therein would have to be stored. To reduce the memory requirements, which is in particular to be aimed at when the storage takes place on the module, provision can be made for a data compression to be carried out and for the compressed data to be stored on the module. An according procedure is also possible in those cases in which the storage does not take place on the module. Provision can in particular be made for the data to be stored in a manner which has lower memory requirements and which allows inferences to be drawn with respect to data not stored. For example, instead of all identifiers of a range of identifiers, only the range boundaries can be stored, whereby the memory space is substantially reduced. The information can be taken from the range boundaries that the identifiers which are not stored and which are located between or outside the range boundaries also belong to a subscriber territory or lie outside it.

Provision is made in a further aspect of the invention for the determination unit to be made such that the information can be transmitted to the mobile device whether the mobile device is located in a subscriber territory. The mobile device can then indicate to the user, preferably by means of an indication on the display, that his mobile device is located in a subscriber territory.

If more than one subscriber territory is provided, provision can be made for the information transmitted from the module to the mobile device to include information in which of the plurality of subscriber territories the user is located. An interface is provided between the mobile device and the module for the transmission of the information. This can correspond to the interface via which the module receives the identifiers and/or coordinates of the location areas and/or radio cells from the mobile device.

The present invention further relates to a method of operating a communications system for mobile radio telephony comprising mobile devices and modules which can be inserted into the mobile devices, with at least one subscriber territory being fixed inside the total territory covered by the communications system inside which subscriber territory communication takes place from and/or to the mobile devices under special conditions, and with a determination taking place whether the mobile device is located in the subscriber territory. In accordance with the invention, the determination whether the mobile device is located in the subscriber territory takes place on the module or in a determination unit which is accessed by remote polling, preferably at the instigation of the module.

Advantageous embodiments of the method in accordance with the invention are also the subject herein.

BRIEF DESCRIPTION OF THE DRAWINGS

Further details and advantages of the present invention will be explained in more detail with reference to the embodiment shown in the drawing.

There are shown.

DESCRIPTION OF THE PREFERRED EMBODIMENTS

Figure 1:
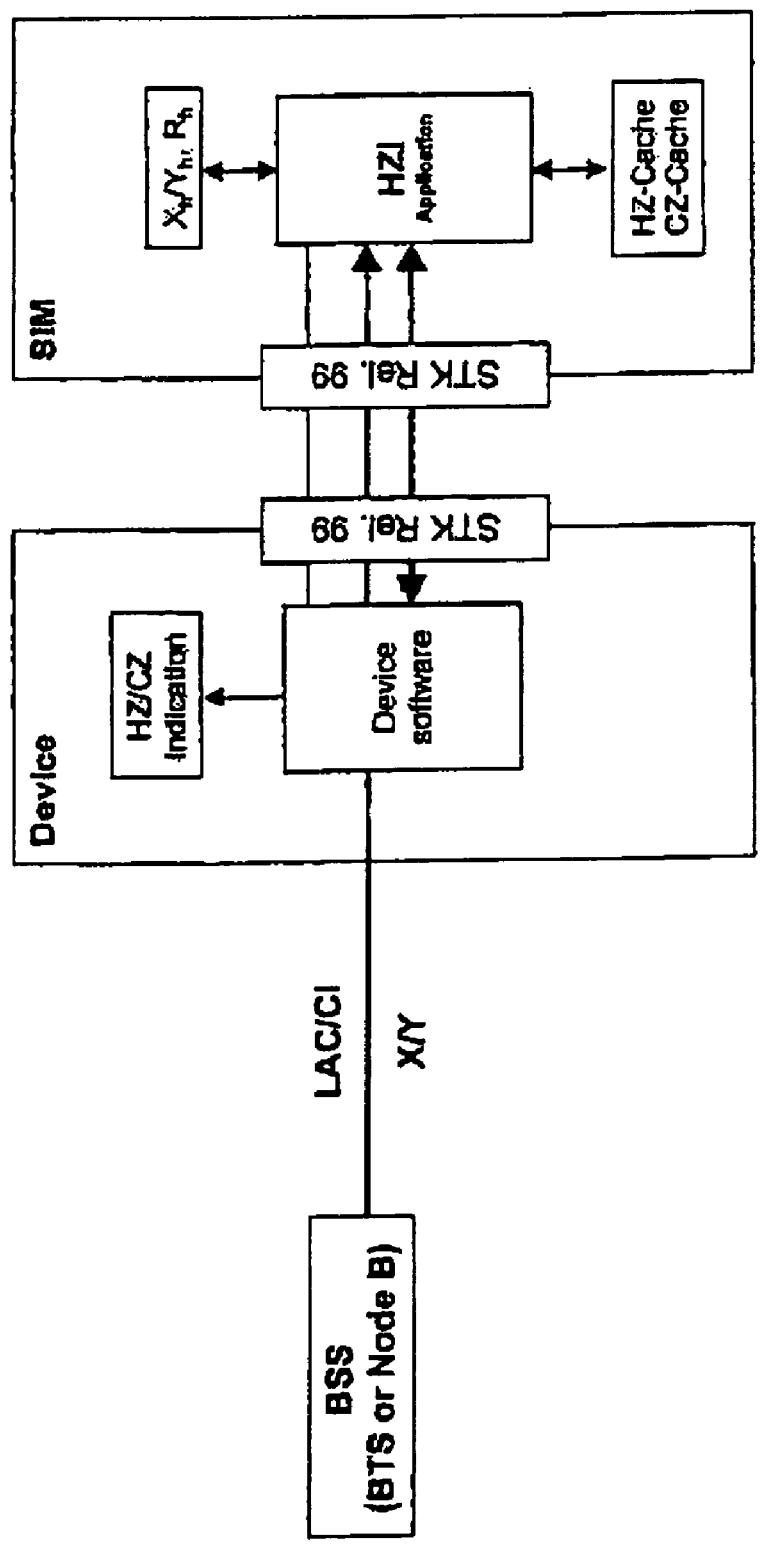
FIG. 1: a schematic design of the communications system in accordance with the invention in a first embodiment with an application stored on the SIM module for the determination of the association with a subscriber territory.

FIG. 1 shows, in a schematic representation, the mobile device and a SIM module (SIM) located in it. The SIM module is handed over to the user on the activation of his mobile phone connection and is then inserted into the mobile device. The mobile device receives identifiers (LAC/CI) and coordinates (X, Y) of the radio cell in which the mobile device is located via a transmitter and receiver unit (BSS). The coordinates of the radio cell are characteristic for the geographic position of the radio cell and can, but do not have to, correspond to the location of the transmitter and receiver unit which serves the radio cell. The coordinates of the radio cell depend on the region covered by the radio cell and are unambiguous for each radio cell. The identifiers consist of the identifier of the location area (LAC=location area code) and of the radio cell (CI=cell ID). The LAC/CI identifier accordingly likewise unambiguously characterizes the location area and the radio cell located therein inside of the total territory covered by the communications system.

The mobile device receives the data transmitted by the transmitter and receiver unit and forwards them to the SIM module. This handover takes place via a standard interface (STK Rel. 99) between the mobile device and the SIM module.

Coordinates of a circular territory are stored on the SIM module and consist of the center (Xh, Yh) of the circle and of its radius (Rh). Depending on the number of subscriber territories, a plurality of sets of these coordinates can be stored. For example, the coordinates characteristic for a first subscriber territory (home zone) and the coordinates characteristic for a second, larger subscriber territory (city zone) can be stored. Furthermore, identifiers of location areas and of radio cells are stored on the SIM module which are disposed inside the first subscriber territory (home zone) and inside the second subscriber territory (city zone). The associated memories are designated by HZ cache and CZ cache in FIG. 1.

After receipt of the identifiers, a corresponding software application on the SIM module checks whether the received identifiers of the location areas and/or of the radio cells coincide with the stored identifiers. If this is the case, a control signal is transmitted from the SIM module to the mobile device so that the latter generates an indication that the mobile device is located inside a subscriber territory. Provision can be made with location areas which are disposed fully inside a subscriber territory for only the identifiers of the location areas LAC to be stored since, in these cases, a check only has to be made whether the received identifier LAC coincides with a stored identifier LAC. If this is the case, it is certain that the mobile device is located inside a subscriber territory. With smaller subscriber territories, it will generally be necessary to use the identifier LAC/CI unambiguously characterizing a radio cell and to compare it with a stored value.

Corresponding coordinates can already be written to the memories HZ cache and CZ cache on the activation of the mobile radio phone connection or also only during operation as the result of the following evaluation of the coordinates.

Subsequent to the aforesaid examination, the SIM module determines whether the received coordinates X, Y of the location area or of the radio cell are disposed in a circular region whose coordinates Xh, Xh, Rh are stored on the SIM module. For this purpose, the distance of the coordinates X, Y of the radio cell from the center of the circle Xh, Yh is calculated using Pythagoras' theorem and a subsequent determination is made whether it is larger than, equal to or smaller than the radius Rh of the aforesaid circle. For this purpose, the squares of the amounts of X-Xh and Y-Yh are added and the result of the addition ($D^2$) is compared to the square of the radius Rh. If $D^2$ is greater than $Rh^2$, the coordinates of the location area or of the radio cell are outside the subscriber territory. If it is not the case, that is if the mobile device is located inside the corresponding subscriber territory, this result is transmitted from the SIM module to the mobile device and a corresponding signal or indication is then generated in its display (HZ/CZ indication).

The reason for the comparison preferably carried out of the values $D^2$ and $Rh^2$ instead of D and Rh can be seen in the fact that it is prevented in this manner that the square root has to be taken of the result $D^2$ of the above addition, whereby calculation effort is saved. The value $Rh^2$ is accordingly stored on the SIM module in an aspect of this type.

It is naturally likewise possible to store the value Rh on the SIM module.

If it is found in this calculation that the coordinates of a location area or of a radio cell are disposed outside the aforesaid circular region whose identifier is, however, stored in the SIM module as belonging to the subscriber territory, the previously generated indication in the display is removed again. Provision can furthermore be made for this identifier to be removed from the memory of the SIM module. If it is found in the calculation that the coordinates of a location area or of a radio cell are disposed on or inside the circular region whose identifier is, however, not stored in the SIM module as belonging to the subscriber territory, provision can be made for a corresponding indication to be generated in the display of the mobile device and the identifier of the location area or of the radio cell be stored in the SIM module after calculation has taken place.

The method described above can be carried out not just for one subscriber territory, but also for a plurality of subscriber territories. According to the result of the calculation, it cannot only be indicated to the user that his mobile device is located in a subscriber territory, but also in which one.

Figure 2:
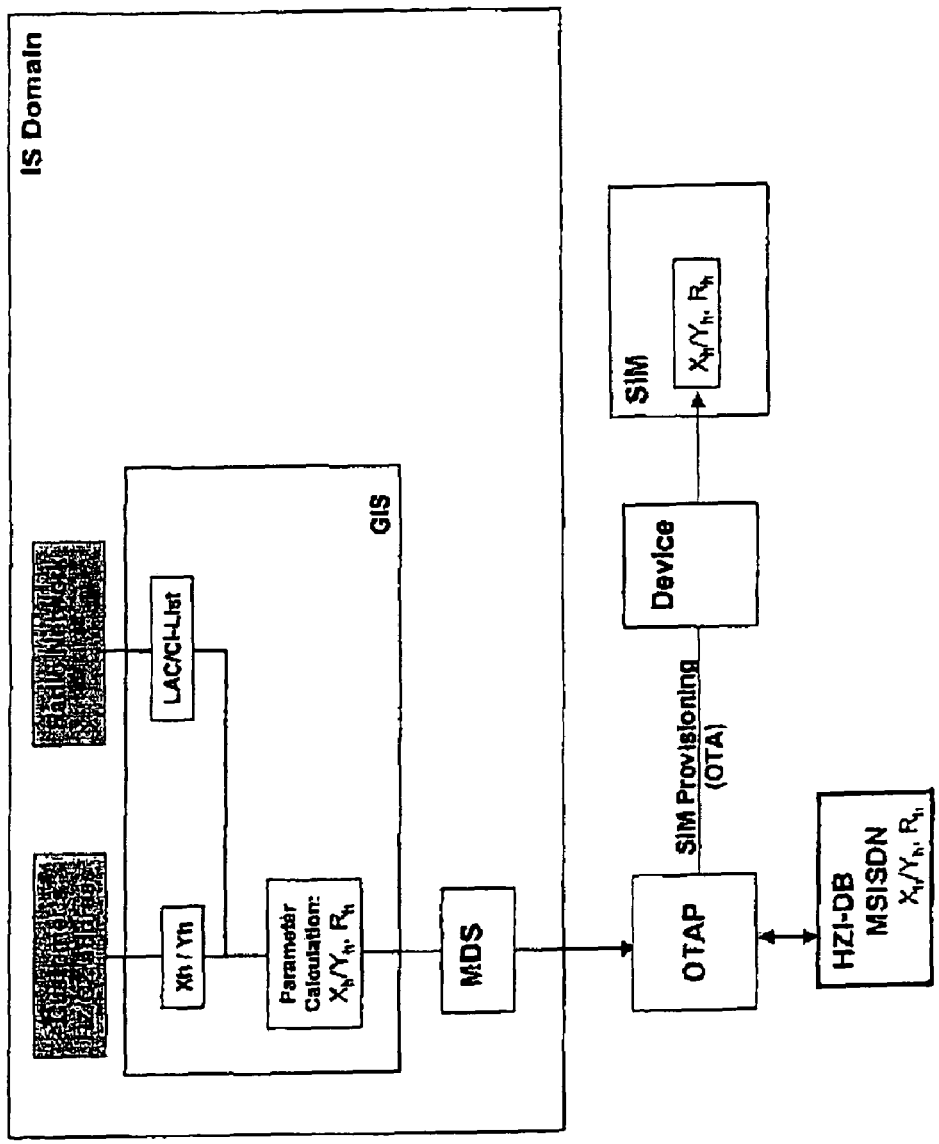
FIG. 2: a process routine for the determination and storage of coordinates on the SIM module.

The provision of the coordinates Xh, Yh and Rh on the SIM module takes place in accordance with FIG. 2. On the activation of a mobile radio phone account, the customer gives his address and states which subscriber territory (home zone HZ, city zone CZ or other) should be activated or whether a plurality of subscriber territories should be activated. The determination of the radius Rh takes place on the basis of this information with the help of the identifiers of the location areas and/or of the radio cells (LA/CI list). The data Xh, Yh and Rh defining a circle around the location Xh, Yh are then transmitted by radio signal, for example by SMS, via the over-air interface OTAP (over-the-air platform) to the mobile device and from this to the SIM module in which they are stored.

As can be seen from FIG. 1, no special application is required on the part of the mobile device to provide the aforesaid service. The only requirement is the presence of an interface which permits the required communication between the SIM module and the mobile-device.

The communications system shown in FIG. 1 requires the coordinates X, Y of the location area or of the radio cell to be transmitted to the mobile device and from this to the SIM module so that a check can be made on the latter whether they are disposed on, inside or outside a predetermined territory.

Figure 3:
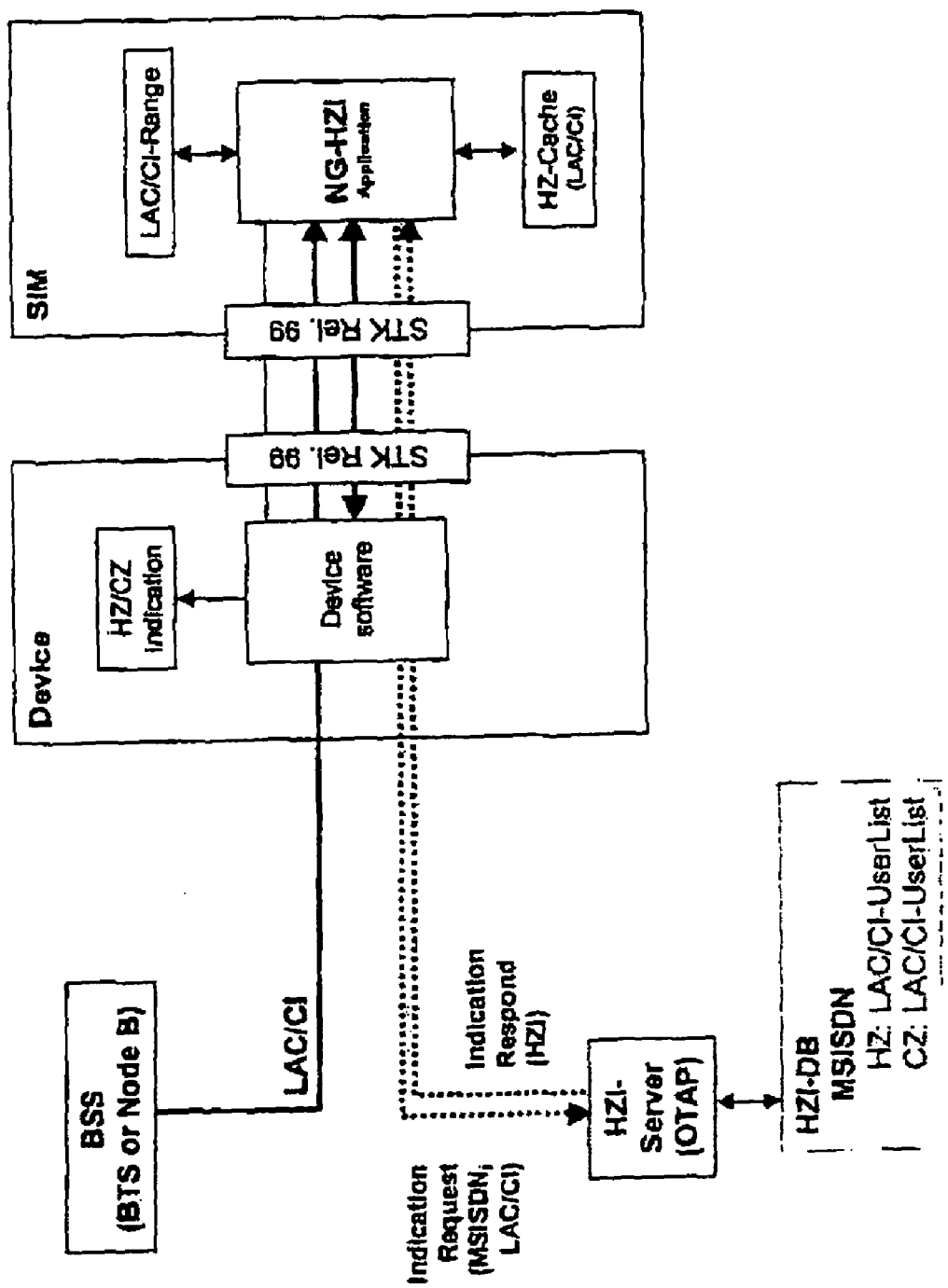
FIG. 3: a schematic design of the communications system in accordance with the invention in a further embodiment with an application stored on a determination unit for the determination of the association with a subscriber territory.

The further embodiment of the present invention shown in FIG. 3 does not necessarily require the transmission of the coordinates of the location area and of the radio cells to the mobile device. As can be seen from FIG. 3, it is not the coordinates of the radio cell which are transmitted to the mobile device by the transmitter and receiver station BSS, but only the identifier LAC of the location area and the identifier CI of the radio cell in which the mobile device is located. The identifiers are then forwarded to the SIM module by means of the interface. A memory (HZ cache) with identifiers LAC/CI of the radio cells which are located in a subscriber territory, in the present example in the home zone (HZ), is located on the SIM module.

On the side of the SIM module, a poll takes place in a memory in which identifiers (LAC/CI Range) of location areas and/or of radio cells are stored. If the identifier received is not located in the stored identifiers, no control signal is output by the SIM module for the indication of the belonging to a subscriber territory to the mobile device and the procedure is ended. If, however, the identifier received is located in the range of the stored identifiers, the examination is carried out whether the identifier is stored in the HZ cache memory. If this is the case, an indication is generated in the display of the mobile device which illustrates that it is located in a subscriber territory. Otherwise, a poll is made of a server (HZI server) while indicating the MSISDN which checks by polling a database (HZI DB) whether the identifier transmitted to it belongs to the identifiers stored in the database which define the subscriber territory/territories of the user in question. The result is forwarded from the server to the mobile device and from this to the SIM module. If the result of the examination is positive, i.e. if the mobile device is located in a subscriber territory, the SIM module provides a control signal to the mobile device in whose display a corresponding indication occurs.

Figure 4:
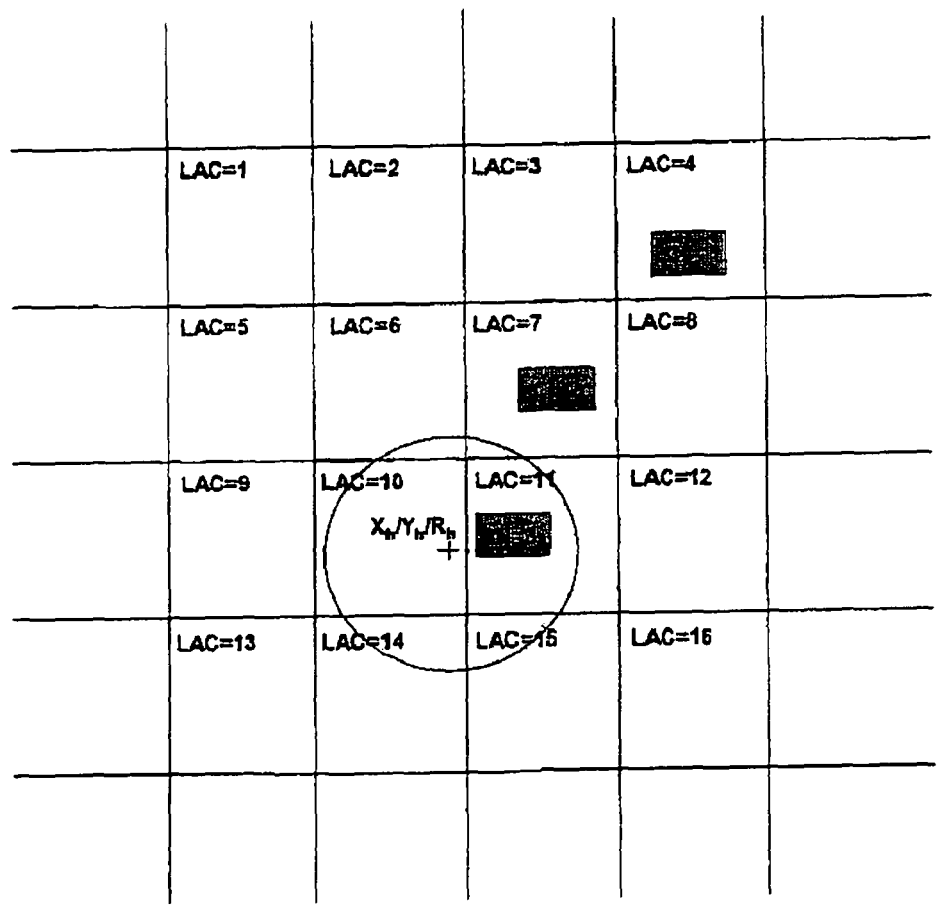
FIG. 4: a schematic representation of location areas and radio cells for the explanation of the access to the determination unit.

FIG. 4 explains the method described in more detail: the circular territory is unambiguously defined by the center Xh and Yh and by the radius Rh. The location areas with the identifiers LAC 6, 7, 10, 11, 14 and 15 are partly inside the circular region. These identifiers are stored in a memory of the SIM module which is termed the LAC/CI range in FIG. 3. If the SIM module contains an LAC identifier outside this range (e.g. LAC=4), no poll of the server in accordance with FIG. 3 is carried out and the procedure is terminated. If the SIM module receives an LAC identifier belonging to the LAC/CI range, a poll of the memory HZ cache takes place. If the identifier is stored there, an indication is generated that the mobile device is stored in the subscriber territory. If, for example, the identifier LAC/CI=7/2 is obtained, the SIM module check whether this identifier is stored in the memory HZ cache. If this is not true, as in the present case, the SIM module transmits a query to the HZI server which makes a check by means of the database HZI-DB whether the identifier received can be found inside a list (HZ or CZ LAC/CI user list) belonging to a subscriber territory. The result, which is negative in the present example, is transmitted to the SIM module by means of the mobile device. If the SIM module receives the identifier LAC/CI=11/3, the check is made whether the identifier is located in the memory in which the data LAC/CI range are located. If the identifier LAC=11 is stored there, a poll of the memory HZ cache takes place. If the identifier LAC/CI=11/3 is stored there, an indication is generated that the mobile device is located in the subscriber territory. If this is not the case, a poll of the server is started, with the server in this case transmitting a positive result which is indicated on the display of the mobile device. The identifier LAC/CI=11/3 is then written to the memory HZ cache.

In a preferred embodiment of the invention, the memory (HZ cache) provided on the SIM module only stores the identifiers LAC/CI of a relatively small subscriber territory since, in this case, data quantities which are still manageable are present. A subscriber territory of this type can, for example, be a specific region (home zone) around the residence of the user.

Figure 5:
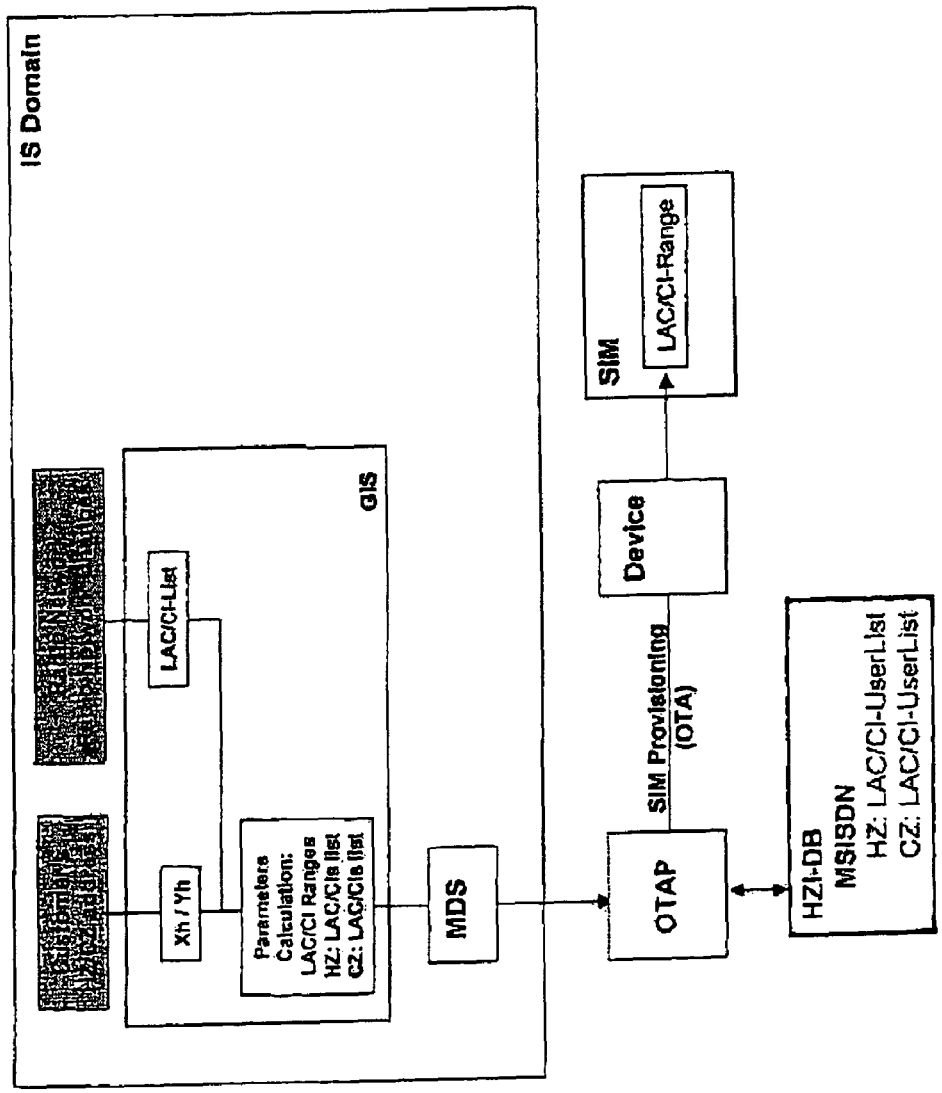
FIG. 5: a process routine for the determination and storage of a range of identifiers of location areas and/or radio cells on the SIM module.

FIG. 5 shows the determination and transmission of the data LAC/CI range. The file LAC/CI range with the identifiers of the location areas and/or of the radio cells which have contact points with the subscriber territory is determined from the residence of the user or from the coordinates Xh and Yh and the size of the subscriber territory. Furthermore, a file (HZ and CZ LAC/CI list) is determined for each subscriber zone CZ, HZ with identifiers of the location areas and/or of the radio cells which are disposed inside the subscriber territories CZ, HZ. This file is stored on the database HZI-DB and is available for polling by the server.

In contrast to the data of the HZ cache, which are stored on the SIM module in the course of operation in a preferred embodiment of the invention, the data LAC/CI range are written to the SIM module and are stored there on activation. The identifiers LAC/CI can be designed such that they permit unambiguous conclusions on the geographic position of the location area or of the radio cell.

Figure 6:
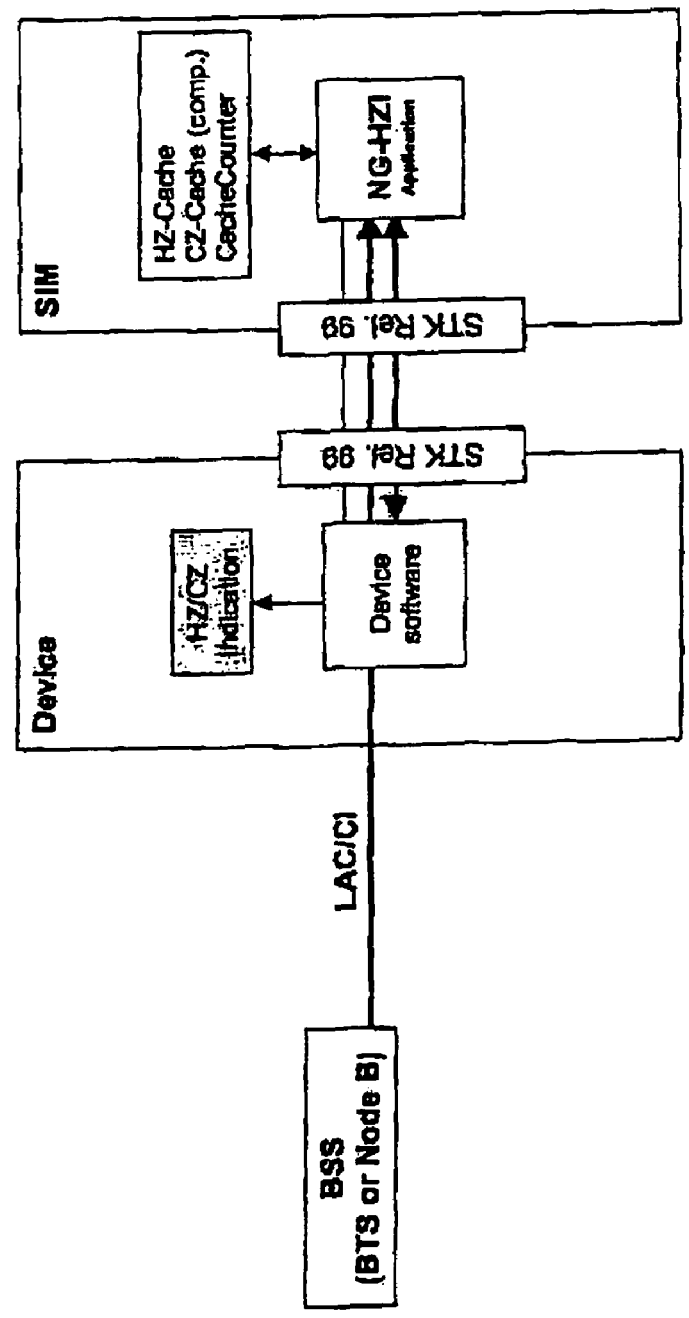
FIG. 6: a schematic design of the communications system in accordance with the invention in a further embodiment with identifiers of the location areas and of the radio cells for two subscriber territories stored on the SIM module.

FIG. 6 shows a further embodiment of the present invention. A communications system of this embodiment likewise manages without the transmission of the coordinates of the location area or of the radio cell in which the mobile device is located. On the part of the transmitter and receiver unit BSS, only the identifier LAC/CI of the location area and/or of the radio cell in which the mobile device is located is transmitted. It is passed by the mobile device to the SIM module and is compared here with a list of identifiers of the location areas and/or of the radio cells which are stored in memories (HZ cache, CZ cache) of the SIM module. In the case of coincidence, it is indicated in the display of the mobile device, on the basis of a corresponding control signal from the SIM module to the mobile device, that the mobile device is located inside a subscriber territory. Provision is made in accordance with the embodiment shown in FIG. 6 for lists to be provided for the different subscriber territories CZ and HZ so that the association with a corresponding subscriber territory is indicated in the display. The identifiers of all location areas and/or radio cells are stored in the memory HZ cache which belong to the home zone HZ. The identifiers of all location areas and/or radio cells are stored in the memory CZ cache which belong to the generally larger city zone CZ.

If the identifier received is not an element of the stored identifiers, no corresponding indication is made.

Figure 7:
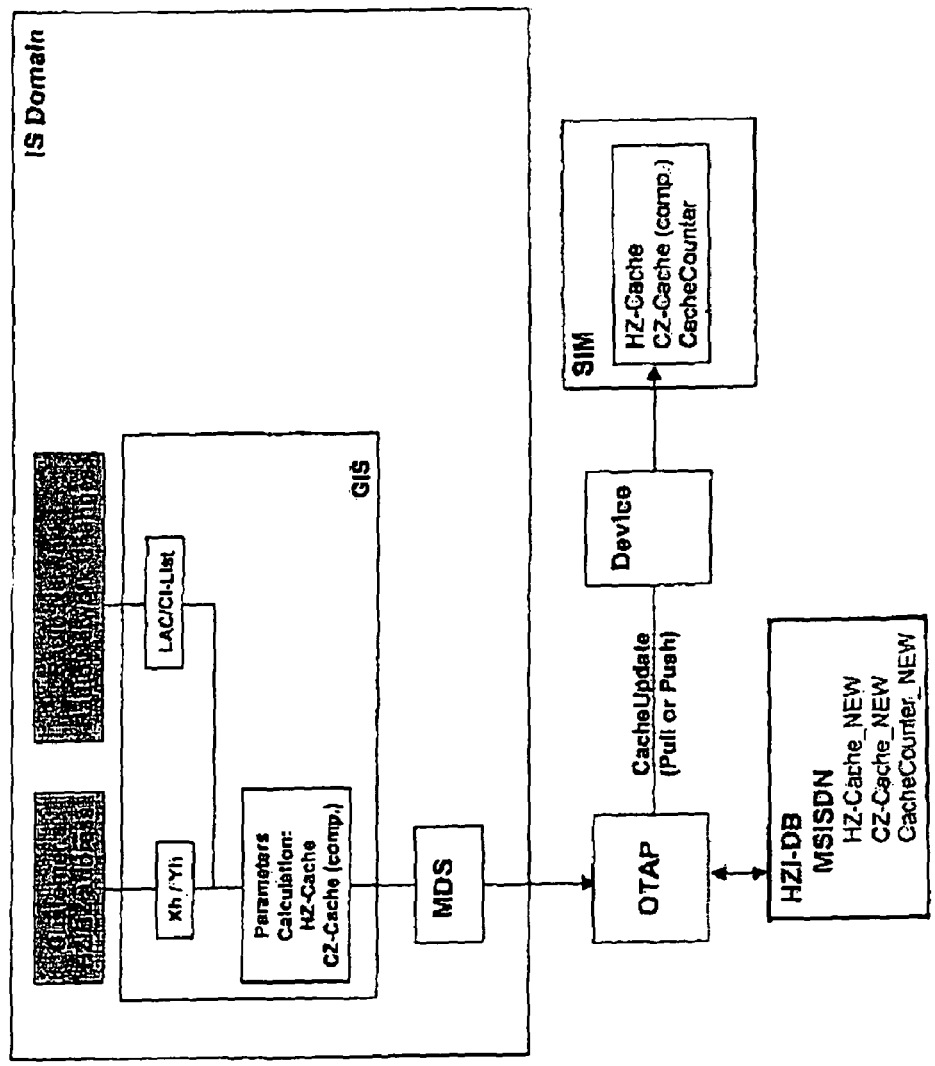
FIG. 7: a process routine for the determination and storage of identifiers of location areas and radio cells on the SIM module.

FIG. 7 illustrates the determination and transmission of the identifiers of the location areas and/or radio cells which belong to the corresponding subscriber territories to the mobile device. They are determined on the basis of the address Xh, Yh, which corresponds, for example, to the residence of the subscriber, but which can also be any other desired address, and on the basis of the size of the subscriber territory which can depend on the radius of a circle around the center Xh, Yh or on the city limits and are then transmitted via the over-the-air interface OTAP to the mobile device and from there to the SIM module in which they are stored.

Provision can be made for a new preparation of the stored files to be necessary on a change of residence or on changes to the communications network. The file with the new identifiers can be transmitted directly to the SIM module via OTAP. Alternatively to this, provision can be made for the file (HZ, CZ cache NEW) to be first stored in a database (HZI-DB) and to be requested by the SIM module at a later date. If the data stored on the SIM module do not agree with those stored in the database, the files of the database are transmitted to the SIM module via OTAP.

In the case of larger subscriber territories such as a city zone of a large city, the amount of identifiers to be stored in the cache is problematic. The city zone of a large city can, for example, include 600 cells. Home zones, in contrast, typically include approximately 20 cells so that the storing of their identifiers on the SIM module, for example, is less problematic. To eliminate the problem of the storage of large data amounts, provision can be made to reduce the data amount by a type of storage of at last some of the data to be stored in a manner reducing the storage requirements. Possible compression methods are, for example, ZIP or RAR.

In an embodiment, provision can be made to reduce the memory requirements in that a check is made which location areas are fully disposed inside a subscriber territory, for example a city zone. It is sufficient for these location areas only to store the identifiers LAC since the storage of the cell identifiers CI is not necessary. For location areas where the majority of the cells are disposed inside a subscriber territory, only the identifiers LAC/CI of the radio cells are saved which are disposed outside the subscriber territory since their number is smaller. If it is found on a comparison with a received identifier that the received identifier is among the stored identifiers it is clear that the mobile device is not located in the subscriber territory. With location areas where the majority of the cells are disposed outside a subscriber territory, only the identifiers LAC/CI of the cells are stored which are located inside the subscriber territory.

In this manner, a compression of the data amount to be compressed by a factor of 30 can be achieved for a city zone of the city of Berlin.

Alternatively, a configuration of the subscriber territories and location areas is possible such that the boundaries of the location areas coincide precisely with the boundaries of the subscriber territory so that a subscriber territory is defined completely and unambiguously by the giving of the location areas, i.e. only the identifier LAC has to be saved.

Provided the identifiers of all radio cells have a serial number, it is possible only to store the serial number or the CI of a radio cell located in the subscriber territory. If a received CI has a different serial number, it is determined whether the cell belongs to the relevant subscriber territory with reference to the difference between the two serial numbers.

Provided the identifiers of the radio cells of a subscriber territory are disposed in a specific range, it is possible not to save all the identifiers of this range, but only the range boundaries. If the received identifier of a radio cell is not in this range, it is determined that the mobile device is not located in the subscriber territory. It is not damaging here if the stored range includes identifiers which do not exist, since all that is important is whether all existing identifiers of radio cells of a subscriber territory are covered by the stored range.

Most transmitter and receiver stations do not serve one radio cell, but three. They are also known as sectors. Typically, an unambiguous LAC/CI is associated with each sector, i.e. with each radio cell. Since all sectors of one transmitter and receiver unit are arranged in the same subscriber territory in most cases, it can be sufficient to store only the LAC/CI of a sector, i.e. of a radio cell, if it is ensured that the two further sectors can be derived from the stored value. This can be realized e.g. in that the first value of the identifier for the two further sectors is incremented by the value of 2 in each case, whereas the further figures of the identifier are the same. An identifier of the three sectors of a transmitter and receiver station would thus e.g. be feasible in the pattern 0xxxx, 2xxxx, 4xxxx or 1xxxx, 3xxxx, 5xxxx. In both cases, the storage of the identifier of only one sector of the transmitter and receiver station is sufficient since the two other identifiers result from addition or subtraction of the value 2.

A further possibility of the reduction of the data amount to be stored results when the subscriber territories are provided with a coordinate system. If the received identifiers CI of the radio cells are encoded such that the coordinates can be calculated from CI, it can be determined on the basis of this determination whether the radio cell is disposed inside the subscriber territory. Only the identifier LAC of the location areas which are located in the subscriber territory or in the region of the subscriber territory and the size of the subscriber territory have to be saved.

Provision can furthermore be made for the identifiers LAC of the location areas which are disposed completely or partly inside a subscriber territory to be stored on the SIM module or on another memory unit. If a received LAC does not coincide with a stored identifier LAC, it is determined that the mobile device is not located in the subscriber territory. For the case of coincidence, it is determined with reference to the received identifier CI of the radio cell in which subscriber territory the radio cell is located. The received identifier CI is encoded such that it can be seen from this in which subscriber territory of the location area the cell is located. If the subscriber territory which can be determined therefrom is not the one saved on the SIM module, it is determined that the mobile device is not located in the subscriber territory.

A further possibility of reducing the data amount to be stored can be achieved in that the radio cells of a location area have an identifier which unambiguously characterizes their position relative to one another in the location area. Provision can be made, for example, to provide the location area with a coordinate system X, Y. The values X and Y can adopt values between 0 and 255. A radio cell with the coordinates X=170 and Y=10 would correspondingly be 170 numbers away from the coordinate origin in the direction of the abscissa and 10 numbers away from the coordinate origin in the ordinate direction. In this embodiment of the invention, the identifiers of the cells are stored on the SIM module or in another memory unit which are located inside the same location area and inside the same subscriber territory. For a determination of the belonging to the subscriber territory, in each case at least two identifiers of cells are selected which differ both in their X coordinate and in their Y coordinate. A square or rectangle can thus be formed of which two corner points are formed by the known coordinates of the cells. If an identifier CI is then received, a check is made whether the associated cell is disposed inside the rectangle. If this is the case, it is determined that the mobile device is located inside the subscriber territory.

The examination of the association with a subscriber territory and the storing of data can generally take place on the SIM module and/or on a determination unit which can be accessed by means of remote polling.

Figure 8:
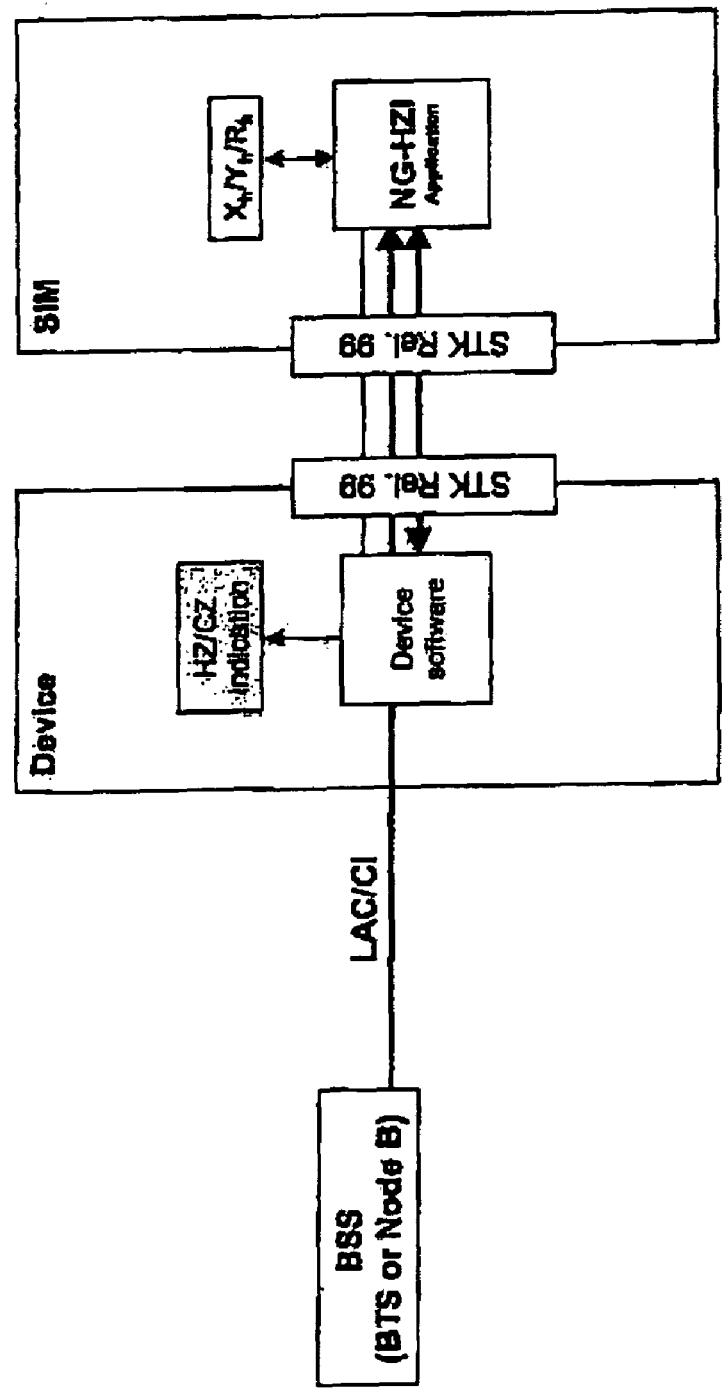
FIG. 8: a schematic design of the communications system in accordance with the invention in a further embodiment with an application stored on the SIM module for the determination of the association with a subscriber territory and with an application for the determination of coordinates from identifiers of the location areas and/or radio cells.

FIG. 8 shows the design of the communications system in accordance with the invention in a further embodiment with an application stored on the SIM module for the determination of the association with a subscriber territory and with an application for the determination of coordinates from identifiers of the radio cells.

This embodiment of the invention also does not require the coordinates of the radio cell to be transmitted on the part of the transmitter and receiver antennae. As can be seen from FIG. 8, the identifier LAC/CI is transmitted on the part of the transmitter and receiver antennae. It is received by the mobile device and forwarded to the SIM module. The identifier LAC/CI is encoded such that the coordinates X, Y of the radio cell can be determined therefrom. For this purpose, the total territory is divided into a grid of a specific size in which a separate identifier LAC/CI is associated with each grid field and with the position, i.e. the coordinates, of the grid field being able to be determined from the identifier.

The coordinates X, Y determined in this way by the SIM module can now be checked for their association with one or more regions which are defined by a location Xh, Yh and the radius Rh of a circle surrounding the location as a centre.

Figure 9:
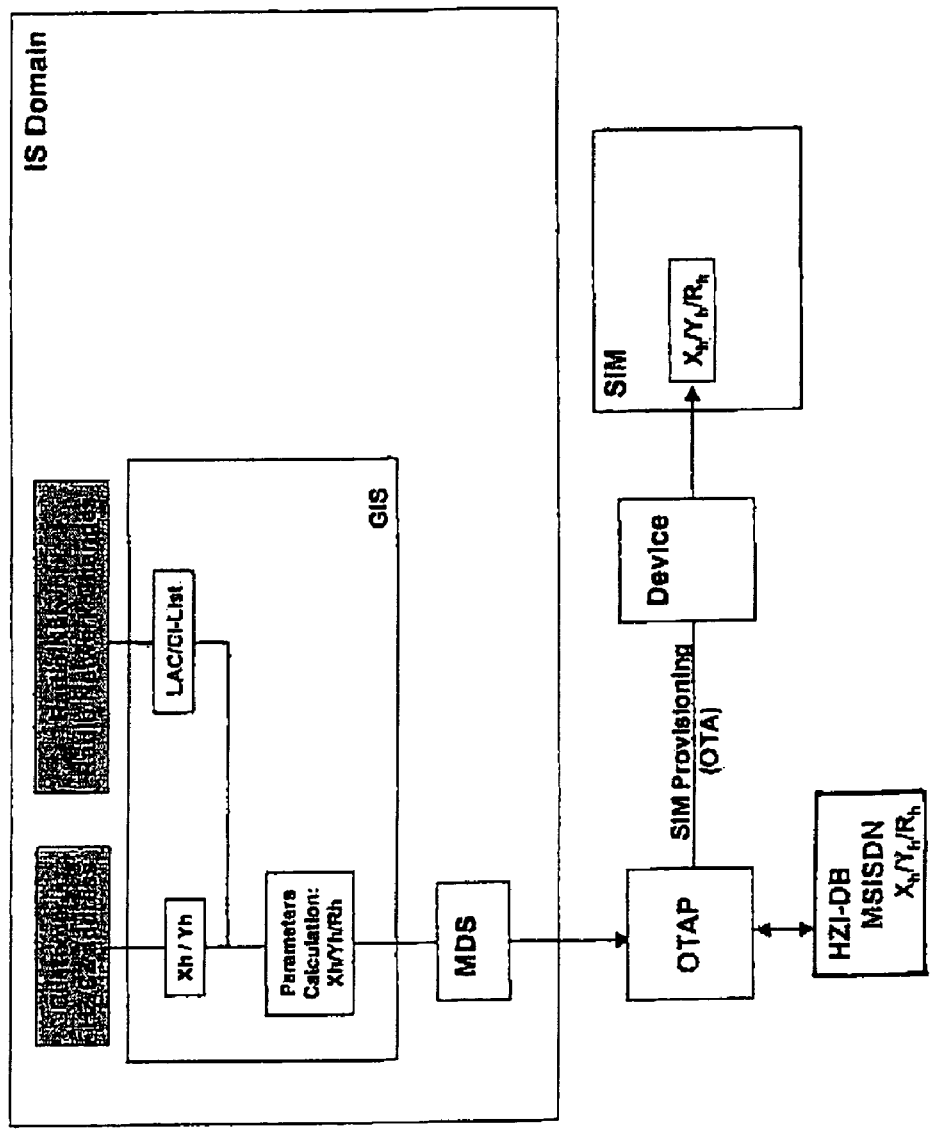
FIG. 9: a process routine for the determination and storage of coordinates on the SIM module.

FIG. 9 shows the process routine for the determination and storing of coordinates on the SIM module. On the basis of the address given by the user, the centre coordinates Xh, Yh are determined and are forwarded together with the radius Rh by means of the over-the-air interface OTAP to the mobile device and from there to the SIM module in which they are stored.

The described communications system and method can be implemented using the GSM standard and using any other desired communications standard such as UMTS.

The invention claimed is:

1. A communications system for mobile radio telephony the system comprising:
a plurality of mobile devices operable within a total territory of the communication system, the total territory being divided into a plurality of location areas,
each mobile device comprising a module insertable into, removable from and distinct from the mobile device,
each mobile device being associated with at least one subscriber territory being fixed inside the total territory,
wherein the at least one subscriber territory includes at least a portion of at least one location area from among the plurality of location areas
wherein said at least one subscriber territory is fixed by data including a location and the radius of a circle surrounding the location as a center, and
wherein each module comprises a processor configured to determine whether a respective mobile device is located inside the at least one subscriber territory by checking whether the received coordinates of the at least one location area in which the mobile device is located falls into the at least one subscriber territory associated with the mobile device, wherein said checking step comprises:
comparing a received location area/cell (LAC/CI) identifier with pre-stored LAC/CI identifiers to determine whether the received LAC/CI identifier is in the range of the pre-stored LAC/CI identifiers, and
determining if the received LAC/CI identifier matches one of the pre-stored LAC/CI identifiers, in the case where it is determined that the received LAC/CI identifier is in the range of the pre-stored LAC/CI identifiers,
wherein said pre-stored LAC/CI identifiers are stored in a memory on the subscriber identity module (SIM).

2. A communications system in accordance with claim 1, wherein the module is the subscriber identification module.

3. A communications system in accordance with claim 1, wherein location areas in which one or more radio cells are located are arranged in the total territory covered by the communications system.

4. A communications system in accordance with claim 3, wherein location areas and/or the radio cells have identity data characterizing them.

5. A communications system in accordance with claim 4, wherein the identity data include identifiers and coordinates.

6. A communications system in accordance with claim 4 further comprising means for transmitting the identity data of the location areas and/or of the radio cells to the mobile devices.

7. A communications system in accordance with claim 4, wherein an interface is provided in the mobile devices by means of which the identity data can be transmitted to the module.

8. A communications system in accordance with claim 1, wherein means are provided in the module by means of which the identity data of the location area or radio cell in which the mobile device is located can be compared with data characterizing the subscriber territory.

9. A communications system in accordance with claim 8, wherein the data characterizing the subscriber territory include identifiers and coordinates of the locations areas and/or radio cells located in the subscriber territory.

10. A communications system in accordance with claim 8, wherein the data characterizing the subscriber territory are stored in the module.

11. A communications system in accordance with claim 9, wherein the module is effective to determine whether the coordinates of a location area or of a radio cell of the communications system are disposed in a region which is fixed by a location and the radius of a circle surrounding the location as a center.

12. A communications system in accordance with claim 11, wherein the coordinates of the location and the radius are stored in the module.

13. A communications system in accordance with claim 11, wherein the identifiers of the location areas and/or of the radio cells identify the corresponding coordinates of the location area and/or of the radio cell to which they apply to facilitate a determination of the coordinates from the identifiers.

14. A communications system in accordance with claim 13, wherein the identifiers of the location areas and/or of the radio cells are designated such that they are in a relationship with the coordinates of the location area and/or of the radio cell so that the coordinates can be determined from the identifiers.

15. A communications system in accordance with claim 9, wherein means are provided in the module by which the coordinates can be determined on the basis of the identifiers.

16. A communications system in accordance with claim 15, wherein the module has means by which it can be determined whether the identifier of a location area and/or of a radio cell coincides with a predetermined identifier of the location area and/or of the radio cell of the subscriber territory.

17. A communications system in accordance with claim 16, wherein the predetermined identifier is stored in the module.

18. A communications system in accordance with claim 1, wherein the identifiers stored in the module are at least partly stored in a form reducing the storage requirements.

19. A communications system in accordance with claim 1, wherein the system further comprises an interface between the mobile device and the module to facilitate the transmission of a control signal indicating whether the mobile device is located in a subscriber territory.

20. A communication system in accordance with claim 1, the system configured to perform a method of operating a communications system for mobile radio telephony, the communication system being divided into a plurality of location areas, each location area including at least one radio cell, the system comprising:
a plurality of mobile devices operable within a total territory of the communication system, the total territory being divided into a plurality of location areas, wherein each mobile device comprises a subscriber identity module (SIM) insertable into, removable from and distinct from the mobile device, and wherein each mobile device is associated with at least one subscriber territory being fixed inside the total territory,
the subscriber identity module (SIM) of each mobile device including a processor configured to:
determining whether a respective mobile device is located inside the at least one subscriber territory by checking whether the received coordinates of the at least one location area in which the mobile device is located falls into the at least one subscriber territory associated with the mobile device, wherein said checking step comprises:
comparing a received location area/cell (LAC/CI) identifier with pre-stored LAC/CI identifiers to determine whether the received LAC/CI identifier is in the range of the pre-stored LAC/CI identifiers, wherein said pre-stored LAC/CI identifiers are stored in a memory on the subscriber identity module (SIM) and
determining if the received LAC/CI identifier matches one of the pre-storedLAC/CI identifiers, in the case where it is determined that the received LAC/CI identifier is in the range of the pre-stored LAC/CI identifiers,
and inform a subscriber of the mobile device that the subscriber is within the subscriber territory in the case where said determining step is true, wherein said pre-stored LA C/CI identifiers are stored in a memory on the subscriber identity module (SIM) and said subscriber territory is fixed by data including a location and the radius of a circle surrounding the location as a center.

21. A method in accordance with claim 20, wherein the examination whether the coordinates of the location area and/or of a radio cell are disposed in the region which is fixed by the location and the radius of the circle surrounding the location as the center is performed by the module.

22. A method in accordance with claim 1, wherein an examination whether the identifier of a location area or of a radio cell coincides with a predetermined identifier of a location area or of a radio cell is performed by the module.

23. A method in accordance with claim 21, wherein examination whether the identifier of the location area or radio cell coincides with the predetermined identifier takes place prior to the examination whether the coordinates of the location area and/or of a radio cell are disposed in a region which is fixed by the location and the radius of a circle surrounding the location as a center is performed by the module.

24. A method in accordance with claim 20, wherein the location and the radius of the region and/or the predetermined identifiers are stored in the module.

25. A method in accordance with claim 24, wherein the predetermined identifiers are at least partly stored in a manner reducing the memory requirements in the module.

26. A communication system in accordance with claim 20, wherein the identifier of the location area and/or of the radio cell and/or their coordinates are forwarded by a transmitter and receiver station to the mobile device and from this to the module.

27. The communication system according to claim 20, wherein the assigning step further comprises storing the three parameters within a memory of the mobile device.

28. A method of operating a communications system for mobile radio telephony, the communication system being divided into a plurality of location areas, each location area including at least one radio cell, the method comprising:
determining, by a subscriber identity module, whether a respective mobile device is located inside the at least one subscriber territory by checking whether the received coordinates of the at least one location area in which the mobile device is located falls into the at least one subscriber territory associated with the mobile device, wherein said determination by checking comprises:

comparing a received location area/cell (LAC/CI) identifier with pre-stored LAC/CI identifiers to determine whether the received LAC/CI identifier is in the range of the pre-stored LAC/CI identifiers, determining if the received LAC/CI identifier matches one of the pre-stored LAC/CI identifiers, in the case where it is determined that the received LAC/CI identifier is in the range of the pre-stored LAC/CI identifiers, wherein said pre-stored LAC/CI identifiers are stored in a memory on the subscriber identity module (SIM) and said subscriber territory is fixed by data including a location and the radius of a circle surrounding the location as a center, and informing a subscriber of the mobile device that the subscriber is within the subscriber territory in the case where said determining step is true.

29. The method according to claim 28, wherein the assigning step further comprises storing the predetermined identifier within the module of the mobile device.

30. A communications system for mobile radio telephony the system comprising:

a plurality of mobile devices operable within a total territory of the communication system, the total territory being divided into a plurality of location areas, each mobile device comprising a module insertable into, removable from and distinct from the mobile device, each mobile device being associated with at least one subscriber territory being fixed inside the total territory wherein the at least one subscriber territory includes at least a portion of at least one location area from among the plurality of location areas wherein each module comprises a processor configured to poll a determination unit regarding whether a respective mobile device is located inside the at least one subscriber territory by checking whether a received location area/cell (LAC/CI) identifier in which the mobile device is located falls into the at least one subscriber territory associated with the mobile device, wherein said checking step comprises:

comparing a received location area/cell (LAC/CI) identifier with pre-stored LAC/CI identifiers to determine whether the received LAC/CI identifier is in the range of the pre-stored LAC/CI identifiers, and determining if the received LAC/CI identifier matches one of the pre-storedLAC/CI identifiers, in the case where it is determined that the received LAC/CI identifier is in the range of the pre-stored LAC/CI identifiers, wherein said pre-stored LAC/CI identifiers are stored in a memory on the subscriber identity module (SIM).

* * * * *